United States Patent
Saggi et al.

(10) Patent No.: US 12,235,888 B2
(45) Date of Patent: *Feb. 25, 2025

(54) CONTENT SUMMARIZATION LEVERAGING SYSTEMS AND PROCESSES FOR KEY MOMENT IDENTIFICATION AND EXTRACTION

(71) Applicant: SalesTing, Inc., Atlanta, GA (US)

(72) Inventors: Piyush Saggi, Atlanta, GA (US); Nitesh Chhajwani, Atlanta, GA (US); Thomas Ploetz, Atlanta, GA (US)

(73) Assignee: SalesTing, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,466

(22) Filed: Nov. 6, 2023

(65) Prior Publication Data
US 2024/0070187 A1 Feb. 29, 2024

Related U.S. Application Data

(63) Continuation of application No. 16/881,615, filed on May 22, 2020, now Pat. No. 11,836,181.
(Continued)

(51) Int. Cl.
*G06V 20/40* (2022.01)
*G06F 16/45* (2019.01)
(Continued)

(52) U.S. Cl.
CPC ............ *G06F 16/45* (2019.01); *G06F 16/483* (2019.01); *G06N 20/00* (2019.01); *G06V 20/41* (2022.01); *G06V 20/47* (2022.01)

(58) Field of Classification Search
CPC .............................. G06V 20/47; G06F 16/739
See application file for complete search history.

(56) References Cited

U.S. PATENT DOCUMENTS

| 7,137,062 B2 | 11/2006 | Kaufman et al. |
| 7,606,444 B1 | 10/2009 | Erol et al. |

(Continued)

FOREIGN PATENT DOCUMENTS

WO 2020024958 A1 2/2020

OTHER PUBLICATIONS

Lu, Shiyang, et al. "A bag-of-importance model with locality-constrained coding based feature learning for video summarization." IEEE Transactions on Multimedia 16.6 (2014): 1497-1509. (Year: 2014).*

(Continued)

*Primary Examiner* — Siamak Harandi
*Assistant Examiner* — Denise G Alfonso
(74) *Attorney, Agent, or Firm* — NEO IP

(57) ABSTRACT

A system or process may generate a summarization of multimedia content by determining one or more salient moments therefrom. Multimedia content may be received and a plurality of frames and audio, visual, and metadata elements associated therewith are extracted from the multimedia content. A plurality of importance sub-scores may be generated for each frame of the multimedia content, each of the plurality of sub-scores being associated with a particular analytical modality. For each frame, the plurality of importance sub-scores associated therewith may be aggregated into an importance score. The frames may be ranked by importance and a plurality of top-ranked frames are identified and determined to satisfy an importance threshold. The plurality of top-ranked frames are sequentially arranged and merged into a plurality of moment candidates that are ranked for importance. A subset of top-ranked moment candidates are merged into a final summarization of the multimedia content.

20 Claims, 5 Drawing Sheets

Related U.S. Application Data

(60) Provisional application No. 62/851,434, filed on May 22, 2019.

(51) Int. Cl.
  *G06F 16/483* (2019.01)
  *G06N 20/00* (2019.01)

(56) References Cited

U.S. PATENT DOCUMENTS

| | | | |
|---|---|---|---|
| 7,760,956 B2 * | 7/2010 | Lin | G06V 20/40 |
| | | | 382/254 |
| 8,195,038 B2 | 6/2012 | Liu et al. | |
| 8,280,158 B2 | 10/2012 | Adcock et al. | |
| 8,649,573 B1 | 2/2014 | Darbari et al. | |
| 8,763,023 B1 | 6/2014 | Goetz | |
| 8,872,979 B2 | 10/2014 | Bagga et al. | |
| 9,443,147 B2 | 9/2016 | Mei et al. | |
| 9,484,032 B2 | 11/2016 | Yadav et al. | |
| 9,785,834 B2 | 10/2017 | Biswas et al. | |
| 9,830,516 B1 | 11/2017 | Biswas et al. | |
| 9,934,449 B2 | 4/2018 | Gandhi et al. | |
| 10,157,638 B2 | 12/2018 | Ramaswamy et al. | |
| 10,290,320 B2 | 5/2019 | Hu et al. | |
| 10,455,297 B1 | 10/2019 | Mahyar et al. | |
| 10,541,000 B1 | 1/2020 | Karakotsios et al. | |
| 11,120,835 B2 | 9/2021 | Ramaswamy et al. | |
| 11,183,195 B2 | 11/2021 | Joller | |
| 2004/0088723 A1 | 5/2004 | Ma et al. | |
| 2016/0014482 A1 * | 1/2016 | Chen | H04N 21/8456 |
| | | | 386/241 |
| 2018/0130496 A1 | 5/2018 | Mahapatra et al. | |
| 2019/0065492 A1 | 2/2019 | Cheng et al. | |
| 2019/0205395 A1 | 7/2019 | Bonin et al. | |
| 2019/0205652 A1 | 7/2019 | Ray et al. | |
| 2019/0258660 A1 * | 8/2019 | Mani | G10L 25/48 |
| 2019/0377955 A1 | 12/2019 | Swaminathan et al. | |
| 2020/0334468 A1 * | 10/2020 | Agarwal | G06V 20/47 |

OTHER PUBLICATIONS

Fajtl, Jiri, et al. "Summarizing videos with attention." Computer Vision-ACCV 2018 Workshops: 14th Asian Conference on Computer Vision, Perth, Australia, Dec. 2-6, 2018, Revised Selected Papers 14. Springer International Publishing, 2019. (Year: 2019).*
Erol B., et al., "Multimodal Summarization of Meeting Recordings," IEEE, ICME, 2003, 4 Pages.
Fajtl J., et al., "Summarizing Videos with Attention," Asian Conference on Computer Vision Springer, Cham, 2018, 17 Pages.
Lu S., et al., "A Bag-of-Importance Model with Locality-Constrained Coding Based Feature Learning for Video Summarization," IEEE Transactions on Multimedia, Oct. 2014, vol. 16, No. 6, pp. 1497-1509.
Palaskar S., et al., "Multimodal Abstractive Summarization for How2 Videos," Proceedings of the 57th Annual Meeting of the Association for Computational Linguistics, Feb. 8, 2019, pp. 6587-6596.
Sridevi M., et al., "Video Summarization Using Highlight Detection and Pairwise Deep Ranking Model," Procedia Computer Science, Jan. 2020, vol. 167, pp. 1839-1848.
Yadav, Kuldeep, et al. "Vizig: Anchor points based non-linear navigation and summarization in educational videos." Proceedings of the 21st International Conference on Intelligent User Interfaces. 2016. (Year: 2016).

* cited by examiner

CONTENT SUMMARIZATION LEVERAGING SYSTEMS AND PROCESSES FOR KEY MOMENT IDENTIFICATION AND EXTRACTION

CROSS-REFERENCE TO RELATED APPLICATION

This application is a continuation application and claims the benefit of and priority to U.S. patent application Ser. No. 16/881,615, filed May 22, 2020, entitled "CONTENT SUMMARIZATION LEVERAGING SYSTEMS AND PROCESSES FOR KEY MOMENT IDENTIFICATION AND EXTRACTION," and U.S. Provisional Patent Application No. 62/851,434, filed May 22, 2019, entitled "SYSTEMS AND METHODS FOR DETECTING, EXTRACTING, AND COMMUNICATING MATERIAL FROM VIDEO CONTENT," which are incorporated herein by reference in their entirety. In the case of a conflict of terms, the present document governs.

TECHNICAL FIELD

The present systems and processes relate generally to digital video content, and more particularly to systems and processes of detecting, extracting and communicating key moments from video content.

BACKGROUND

Some videos may be too long for many viewers. For example, viewers often do not wish to sit through an entire informational video (for example, a webinar that may be available live or recorded for on-demand viewing). Such videos are very common in education, employee or partner training, and customer support and search. This may be particularly the case when viewers are interested in only a single or limited aspects of a video's subject matter. A viewer may not need to watch an entire video to realize the value of specific material included in the video, for which they may have sought out the video in the first place. Thus, viewers may instead want a shorter version of a video, or may simply desire a set of key moments from the video, which are applicable and of interest and relevance to the viewer.

Traditional key frame identification of video material is based on visual content of the frames. Such traditional approaches typically use color-histogram difference-based techniques. These approaches are not effective for informational videos. For example, a webinar may only show PowerPoint slides generally summarizing content of the webinar and, thus, analysis of only the visual content may not provide significantly accurate indications of the most significantly salient and relevant points of the webinar. Indexing techniques create lengthy tables of content. A sixty-minute video may be indexed to a large number (for example, 45-60) indices, which is an overwhelming quantity for most viewers. Other previous approaches leverage analyses of spoken content in a video to annotate and summarize the content therein. However, in previous approaches, human annotators (who manually process webinar videos and identify and specify moments and their summaries) use more than just the spoken content for their decision making process. In fact, the spoken content often does not even play the most important role in their annotation work.

Recognition of a high level of activity in a portion of a video may not form a sufficiently effective basis for generating a summarization of a video. For example, a portion of an educational lecture may include a high level of audio and visual activity; however, the high activity levels may not correspond to a significantly salient moment in the video. Instead, the high activity levels may correspond to an emotional segment of the video, such as a comedic moment, that does not serve as an effective summarization of the video.

Thus, there is an unmet need for systems and processes, which allow a video to be consumed in shortened format by identifying one or more key video points and making those points available to a user.

BRIEF SUMMARY OF THE DISCLOSURE

Briefly described, and according to one embodiment, aspects of the present disclosure generally relate to systems and processes for extracting and analyzing original content and for generating summarizations of original content based on analyses thereof. In various embodiments, the present disclosure provides technology that segments original content (as defined in the foregoing descriptions) to approximately m key points, which may be referred to as key moment candidates, and that condenses the original content into a final summarization of n key moments selected from the most relevant m key moment candidates. In at least one embodiment, original content is annotated with frame or segment markers to denote semantically similar and significantly salient portions of the original content. In one embodiment, the portions are ranked for importance and/or relevance and a top-ranking subset of the portions are merged into a final summarization of the content.

In one or more embodiments, the system receives an input, which may include at least one video (e.g., provided as an upload to the system, a link, etc.) and a value of n. For example, the system may receive an informational video (for example, a webinar recording), as an upload, and an n value of 7, wherein the system interprets n as a quantitative parameter for how many key moments (e.g., 7 in this example) to include in a final summarization of key moments extracted from the received informational video. Thus, in at least one embodiment, the system may use the value of n as a parameter for determining the quantity of key moments to produce from a video. In some embodiments, the system may use a default value of n (for example, 7) that is predetermined automatically and/or manually by the system (or an input from an operator thereof). In one or more embodiments, n may instead be a duration of time that is used by the system in one or more computations, the output of which may be a quantitative parameter for how many key moments to create from a received video. For example, a user may upload a 60 minute video and input a value 10 minutes for n, thus the user desires the system to truncate the 60 minute video into 10 minutes worth of key moments. In the same example, the system receives both the 60 minute video and the 10 minute input for n, and, at some point, performs one or more computations that generate a quantitative parameter, wherein the parameter determines how many key moments the system may create from the 60 minute video to produce a 10 minute video of key moments. In one or more embodiments, the system may use a default duration value of n (for example, 4 minutes) such that the system generates, from any uploaded video, an output video with the default duration n (in the same example, the system would automatically produce a 4 minute output video from an uploaded 60 minute video).

In one or more embodiments, the system analyzes audio and visual content of each frame of original content using a plurality of analysis modalities. In at least one embodiment, each analysis modality includes computing an importance sub-score for each frame. According to one embodiment, importance sub-scores for each frame are aggregated according to optimized weight values to generate an importance score. In various embodiments, the importance score of each frame is compared to a predetermined importance threshold and frames that satisfy the threshold are merged into moment candidates. According to one embodiment, the moment candidates are ranked according to an overall importance metric, which may be an aggregation of the importance scores of each frame comprising the moment candidate. In one or more embodiments, a plurality of top-ranked moment candidates (e.g., n number) are selected for inclusion in a final summarization. In at least one embodiment, if a length or number of moments in the final summarization exceeds summarization parameters (e.g., duration or n), the process of generating importance scores and identifying top-ranked moment candidates (this time from the final summarization) is repeated until a parameter-satisfying final summarization is obtained. Previous technologies may include means for identifying transitions in topics across multimedia content; however, such technologies may fail to leverage topic transitions for generating a summarization of the multimedia content. Further, previous approaches emphasizing topic transition as a sole or primary determinant of summarization may fail to consider other analytical modalities that better inform, or at least augment, summarization generation processes. Thus, in various embodiments, the technology described herein may improve on the deficiencies of previous approaches by using weighted outputs of topic transition detection, in combination with weighted outputs of other analyses, to provide novel multimodal summarization generation processes.

In various embodiments, the present system extracts audio and visual content from the at least one video, and converts portions of the extracted content to text format. In one or more embodiments, to extract audio content, the system leverages techniques including, but not limited to, natural language processing processes and speech-to-text algorithms. In at least one embodiment, the system maps text content onto one or more timestamped frames of the at least one video. In one or more embodiments, from the visual content, the system extracts and stores the text displayed therein. In some embodiments, the system may extract and separate, from the at least one video, non-text visual information (e.g., such as product demonstration screens, GIFs, animations, human faces, etc.) to create multi-dimensional vector-based representations of video content. Per the present disclosure, a multi-dimensional vector-based representation of video content may include a representation, wherein each dimension of a vector therein encodes specific information as the information is automatically extracted from video (e.g., as described herein).

In one or more embodiments, the system uses vocabulary enhancement techniques to identify differences between textual representations of the at least one video in various non-text dimensions (e.g., described above) and to produce a vocabulary of the at least one video. Per the present disclosure, the vocabulary of the at least one video may refer to a contextual representation of the content of a video, which may be used to compare parts of the at least one video and to measure their similarities. Thus, the contextual representation (vocabulary) abstracts from specifics of the at least one video by embedding the representation into its relevant context, which may lead to more accurate similarity analyses. In various embodiments, vocabulary enhancement techniques may include, but are not limited to, creating a table based on company and domain-specific terms and acronyms, and feeding the table into the system (e.g., prior to a user accessing the system services). In at least one embodiment, the system may generate the table automatically, and the system may automatically update the table after every instance wherein a user accesses the system services and/or edits a word. Thus, the system may use the table repeatedly to process and index textual representations of a video.

In various embodiments, the system, using an identified difference table, processes a video and related material via a domain dictionary filter to identify additional words and markers, which the system may add to a vocabulary of a video being analyzed. Per the present disclosure, difference tables may refer to tables that describe differences between and/or within video content (or parts thereof). In at least one embodiment, differences may be identified through component-wise comparison of two (or more) vocabulary elements (e.g. for example, two phrases). Thus, an entry in a difference set may represent the difference between two vocabulary elements. In various embodiments, component-wise differences may be quantified (e.g., computed) by the system, which may enable a more accurate distance/(dis-)similarity measure between and/or within video content (or parts thereof). In at least one embodiment, the system may use one or more difference sets and component-wise differences for similarity analysis and for adapting vocabulary embeddings (e.g., as described in the preceding paragraph). In one or more embodiments, use of the identified difference set may include leveraging clustering techniques to identify a difference set between a subset of words in a first dimension from a set of words in a second dimension.

In various embodiments, the system may produce the vocabulary of the video automatically via NLP-based techniques. In at least one embodiment, production of the vocabulary may further include, but is not limited to: 1) parsing (e.g., by the system) of a website; and 2) automatically generating a list of domain and company-specific words and acronyms based on the parsed website. In one or more embodiments, automatic generation of the list may include, but is not limited to: 1) comparing a word set of the parsed website to a language vocabulary dataset; and 2) automatically marking words from the parsed word set, which were not found in the language dataset, as candidates for vocabulary enhancement (e.g., words to be added to the video vocabulary). Per the present disclosure, websites may contain context information that can be used to enhance (or even create altogether) a vocabulary and/or vocabulary embedding of a video. Thus, in at least one embodiment, the system automatically mines the context of a video and revises a vocabulary and/or vocabulary embedding by associating the video with a website from which the video was sourced.

In at least one embodiment, to perform analysis of spoken content, the system leverages extracted audio and transcripts generated therefrom via natural language processing (NLP) methods. In one or more embodiments, the system extracts compact representations of spoken content by performing lemmatization, stemming and word embedding. In various embodiments, the system performs automated keyword identification techniques to support topic categorization and similarity computation techniques. According to one embodiment, the one or more identification techniques include, but are not limited to, generating keyword sets via a keyword extractor that is based on generic language features. In at least one embodiment, the keyword extractor is an unsupervised automatic keyword extraction method, such as, for example, YAKE. In one or more embodiments, the system applies one or more techniques for determining similarity and/or dissimilarity between portions of extracted spoken content. In various embodiments, the one or more techniques include, but are not limited to, computing Word Mover's Distance (WMD) values quantifying similarity of spoken content portions, performing pairwise comparisons for quantifying similarity or dissimilarity values via various automated techniques.

Present systems and processes also provide for identification of slide-based frames and for identification and marking of start and end time of slide-based frames in a video stream. In at least one embodiment, the frames are slide based, for example, as would be included in a presentation or webinar on a particular subject. In one or more embodiments, the system uses color-separation values of pixels to identify slides in a video or video stream. For example, the system may leverage software packages and tools (such as an OpenCV library, etc.) to calculate color-separation values of pixels and perform subsequent identification activities. In one embodiment, the system uses a multidimensional vector space to represent the information captured as described above. In various embodiments, the present system may learn vectorial feature representations from multi-modal video descriptions including, but not limited to, spoken language, category of video and frame content. In at least one embodiment, the feature representations may be sourced from processing one or more datasets. In one or more embodiments, the processing may include one or more deep, multi-modal auto-encoders, wherein the one or more multi-modal auto-encoders may generate the feature representations from one or more inner layers. In at least one embodiment, a number of inner layers may determine a complexity of an auto-encoder. For example, a dimension of a multidimensional vector space may be determined by a middle layer, which is the target of the optimization described below.

In at least one embodiment, the system performs an explicit moment identification process. According to one embodiment, the explicit moment identification process includes natural language processing (NLP)-based analysis of spoken content extracted from a content item. For example, spoken content of a webinar may be extracted and analyzed to identify relevant candidate portions (e.g., "moment candidates") that are used as seed-points for portions (e.g., "moments") of a final shortened summarization of the content item.

In one or more embodiments, the system performs a chapterization process including summarization and relevance ranking techniques. In at least one embodiment, the chapterization process includes identifying semantically coherent segments of a content item and aggregating the segments into semantically coherent moment candidates.

According to a first aspect, a method for summarizing multimedia content, including: A) receiving multimedia content, wherein the multimedia content includes one or more frames and each of the one or more frames includes one or more audio elements, one or more visual elements, and metadata; B) extracting of the one or more audio elements, the one or more visual elements, and the metadata from each of the one or more frames of the multimedia content; C) retrieving or generating a transcript of the multimedia content based on the one or more audio elements and the one or more visual elements; D) determining a plurality of keywords from the transcript; E) mapping the plurality of keywords across each frame of the multimedia content; F) computing, for each frame, a plurality of sub-scores based on the keyword mapping, the one or more audio elements, of the one or more visual elements, and metadata, wherein the plurality of sub-scores includes a chapter score and a topic score; G) generating an importance score for each frame of the multimedia content, wherein generating the importance score includes weighting each of the plurality of sub-scores according to predetermined weight values and aggregating the weighted sub-scores; H) generating a ranking of the frames based on the importance scores; I) determining one or more top-ranked frames from the ranking that satisfy an importance threshold; J) merging the one or more top-ranked frames into one or more moments based on a sequential similarity analysis of the determined one or more top-ranked frames, wherein the merging includes aggregating one or more of the one or more audio elements, the one or more visual elements, and the metadata of each of the one or more top-ranked frames; and K) aggregating the one or more moments into a final summarization of the multimedia content.

According to a further aspect, the method for summarizing multimedia content of the first aspect or any other aspect, wherein the plurality of sub-scores further includes a spoken text change score and/or a layout score.

According to a further aspect, the method for summarizing multimedia content of the first aspect or any other aspect, wherein the plurality of sub-scores further includes a speaker score and/or a visual text change score.

According to a further aspect, the method for summarizing multimedia content of the first aspect or any other aspect, wherein the predetermined weight values are machine learned and cross-validation optimized weight values.

According to a further aspect, the method for summarizing multimedia content of the first aspect or any other aspect, wherein: A) the multimedia content is received from a user; and B) the method further includes transmitting the final summarization to the user.

According to a further aspect, the method for summarizing multimedia content of the first aspect or any other aspect, wherein the transcript is retrieved from an external service.

According to a further aspect, the method for summarizing multimedia content of the first aspect or any other aspect, wherein the plurality of keywords are determined using a frequency-based keyword extraction method.

According to a further aspect, the method for summarizing multimedia content of the first aspect or any other aspect, wherein the sequential similarity analysis includes computing one or more Word Mover's Distance values from the keyword mapping.

According to a second aspect, a system for summarizing multimedia content, including: A) at least one server configured for receiving multimedia content, wherein the multimedia content includes one or more frames and each of the one or more frames includes one or more audio elements, visual elements, and metadata; and B) at least one processor configured for: 1) extracting of the one or more audio elements, the one or more visual elements, and the metadata from each of the one or more frames of the multimedia content; 2) retrieving a transcript of the multimedia content based on the one or more audio elements and the one or more visual elements; 3) determining a plurality of keywords from the transcript; 4) mapping the plurality of keywords across each frame of the multimedia content; 5) computing, for each frame, a plurality of sub-scores based on the keyword mapping, the one or more audio elements, the one or more visual elements, and the metadata, wherein the plurality of sub-scores includes a chapter score and a topic score; 6) generating an importance score for each frame of the multimedia content, wherein generating the importance score includes weighting each of the plurality of sub-scores according to predetermined weight values and aggregating the weighted sub-scores; 7) generating a ranking of the frames based on the importance scores; 8) determining one or more top-ranked frames from the ranking that satisfy an importance threshold; 9) merging the one or more top-ranked frames into one or more moments based on a sequential similarity analysis of the determined one or more top-ranked frames, wherein the merging includes aggregating one or more of the one or more of the audio elements, the one or more visual elements, and the metadata of each of the one or more top-ranked frames; and 10) aggregating the one or more moments into a final summarization of the multimedia content.

According to a further aspect, the system for summarizing multimedia content of the second aspect or any other aspect, wherein the plurality of sub-scores further includes a spoken text change score and a layout score.

According to a further aspect, the system for summarizing multimedia content of the second aspect or any other aspect, wherein the plurality of sub-scores further includes a speaker score and a visual text change score.

According to a further aspect, the system for summarizing multimedia content of the second aspect or any other aspect, wherein the predetermined weight values are machine learned and cross-validation optimized weight values.

According to a further aspect, the system for summarizing multimedia content of the second aspect or any other aspect, wherein: A) the multimedia content is received from a user; and B) the method further includes transmitting the final summarization to the user.

According to a further aspect, the system for summarizing multimedia content of the second aspect or any other aspect, wherein the transcript is retrieved from an external service.

According to a further aspect, the system for summarizing multimedia content of the second aspect or any other aspect, wherein the plurality of keywords are determined using a frequency-based keyword extraction method.

According to a further aspect, the system for summarizing multimedia content of the second aspect or any other aspect, wherein the sequential similarity analysis includes computing one or more Word Mover's Distance values from the keyword mapping.

According to a third aspect, a process for training a machine learning model for summarizing multimedia content, including: A) generating at least one machine learning model, wherein the generating includes initializing a plurality of weight values, each weight value associated with one of a plurality of analysis modalities; B) retrieving a training dataset including multimedia content, a first final summarization of the multimedia content, and a plurality of sub-scores for each frame of the multimedia content; C) training the at least one machine learning model to output a final summarization of the multimedia content, wherein the training includes: 1) executing the at least one machine learning model to generate an importance score for each frame of the multimedia content, wherein generating the importance score includes aggregating, for each frame of the multimedia content, the plurality of sub-scores according to the plurality of weight values; 2) generating a second final summarization of the multimedia content based on comparing the generated importance scores to an importance threshold and merging frames associated with threshold-satisfying importance scores into the second final summarization; 3) computing an error metric by comparing the second final summarization to the first final summarization; 4) determining that the error metric does not satisfy an error threshold; and 5) adjusting one or more of the plurality of weight values towards reducing the error metric.

According to a further aspect, the process for training a machine learning model for summarizing multimedia content of the third aspect or any other aspect, wherein the plurality of sub-scores includes a chapter score and a topic score.

According to a further aspect, the process for training a machine learning model for summarizing multimedia content of the third aspect or any other aspect, wherein the plurality of sub-scores further includes a spoken text change score and a layout change score.

According to a further aspect, the process for training a machine learning model for summarizing multimedia content of the third aspect or any other aspect, wherein the plurality of sub-scores further includes a speaker score and a visual text change score.

These and other aspects, features, and benefits of the claimed systems and processes will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
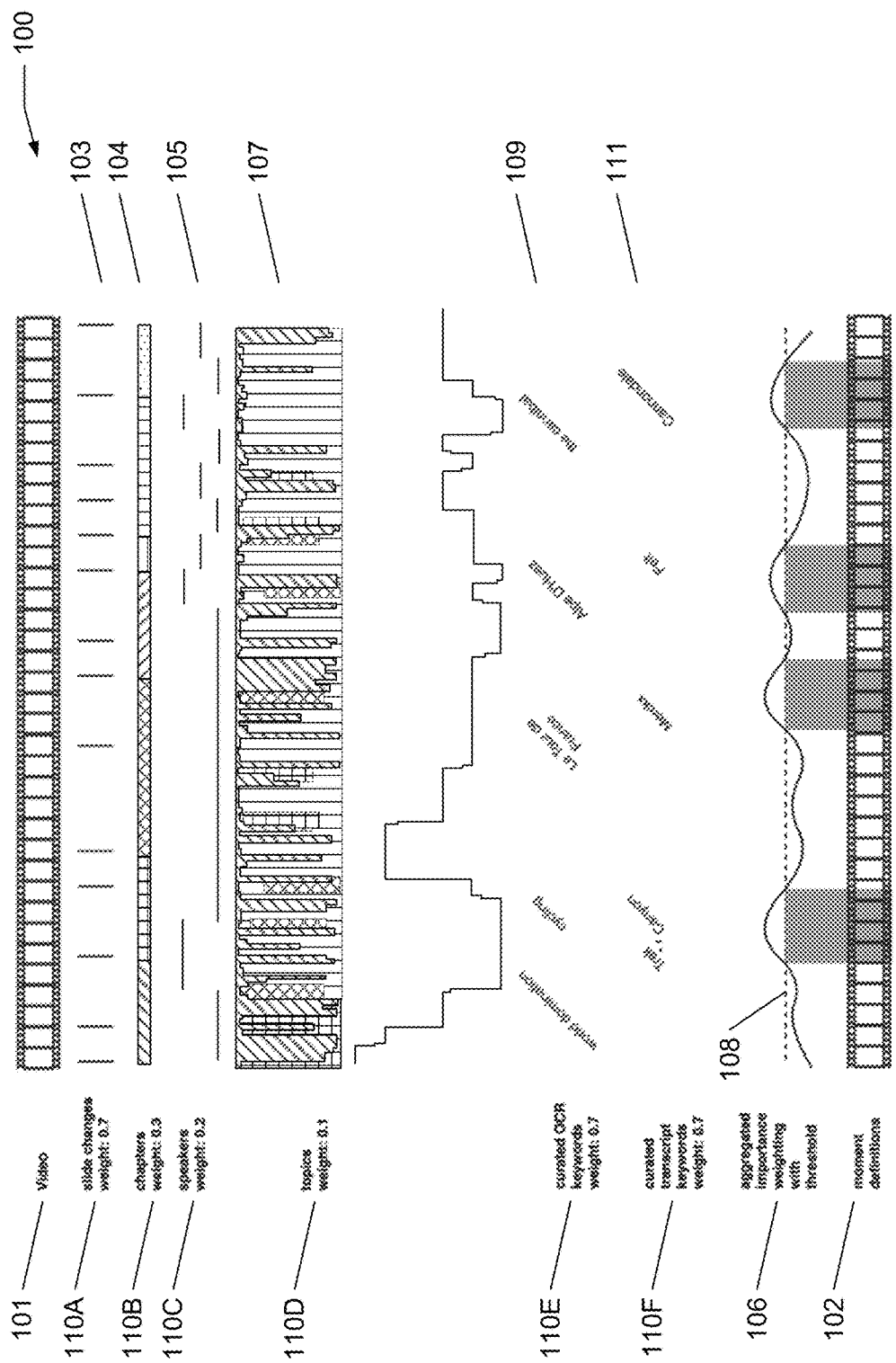
FIG. 1 is a diagram of an exemplary networked environment according to one embodiment.
Figure 2:
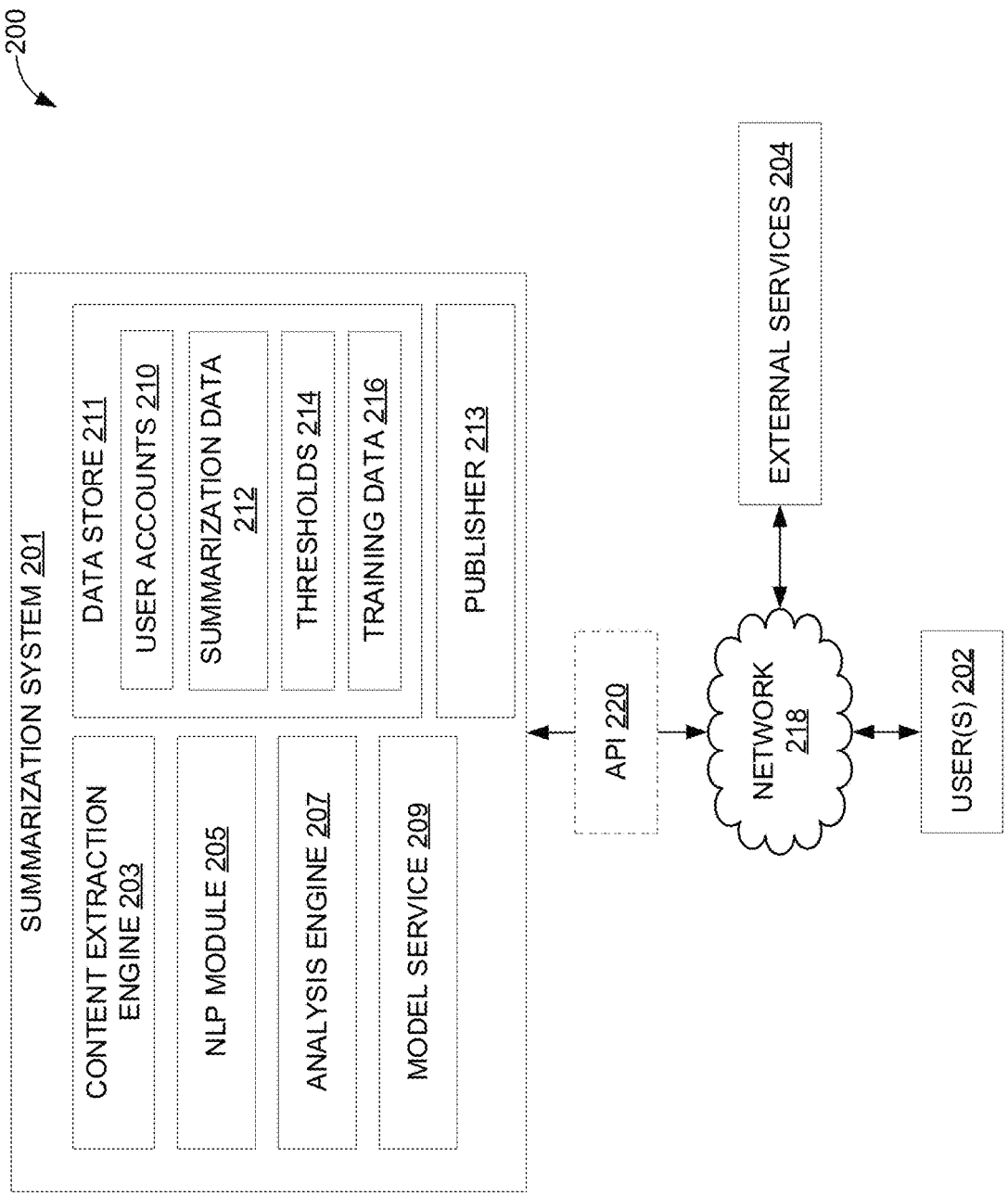
FIG. 2 is a flowchart of an exemplary content summarization process according to one embodiment.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "original content" generally refers to multimedia content from which a final summarization is generated. Original content may be in any suitable file format for supporting audio-visual content (e.g., and may include a plurality of file formats for storing audio content, visual content, metadata, and etc. as appropriate). Original content includes, but is not limited to, webinars, demos, presentations, slideshows, videos, animations, and other multimedia content. The present disclosure places no limitations on multimedia content that may be summarized according to the described systems in processes. In some embodiments, original content is of a single media type, for example only visual content, or only audio content, only text-based content, etc. According to one embodiment, the present systems and processes are operative for generating summarizations of both multimedia and singular media content.

As used herein, "transcript" generally refers to a conversion of audio content (such as spoken content) to text. As used herein, "frame transcript" refers to a consecutive portion of transcript of spoken content uttered while a frame of the original content is presented. According to one embodiment, generation of transcripts described herein includes annotating the transcripts with timestamps indicating transitions between frames of the original content from which the transcript was generated.

As used herein, "chapter" refers to one or more consecutive transcripts for frames of original content that cover a semantic unit of the original content. In one example, multiple frames are merged into individual chapters based on a determination that the frame transcripts thereof include significantly similar content.

As used herein, "chapter summary" refers to a likely most informative transcript representation of a segment of original content. In at least one embodiment, a chapter summary includes individual or sets of sentences or phrases extracted or generated from a chapter transcript. According to one embodiment, a chapter summary is used as a most-informative textual representation of a moment candidate.

As used herein, "moment candidate" refers to a segment of content extracted from original content.

As used herein, a "moment" refers to a moment candidate that conveys information that meets or exceeds a particular level of importance or relevance as compared to other portions of the original content (e.g., other moment candidates). The systems and processes herein are operative for determining if a moment candidate is sufficiently salient and relevant for inclusion in a final summarization of the original content. In various embodiments, a moment includes audio and visual content extracted from the original content, and, in some embodiments, includes summary text generated from a chapter summary of the moment.

As used herein, "auto-encoder" may refer to a model (for example, a neural network) that is trained to learn a lower-dimensional representation of input data (no limitation on modality). In various embodiments, the system trains one or more auto-encoders by first performing a step-wise reduction of data dimensionality towards a pre-defined target dimensionality, and then by reversing the process (also in a step-wise manner) until the original dimensionality is reached. In at least one embodiment, an objective of training may be to find a lower-dimensional representation (for example, in the middle of the model) that will ultimately lead to (e.g., during reversal) the original input data, thereby minimizing reconstruction error between corresponding inputs and outputs of the model (which may be identical). Thus, in some embodiments, "auto-encoder" refers to a duality of an encoder (e.g., a first part of the model that produces the lower-dimensional representation), and a decoder (e.g., a second part of the model that gradually reconstructs the original input data from the lower-dimensional representation produced by the encoder part) that, overall, minimizes the error between input and output. In one or more embodiments, an auto-encoder may only use input data (e.g., the auto-encoder may not leverage additional data sources or annotations). In various embodiments, the system learns a lower-dimensional representation (e.g., by using the above process and input data) that may serve as a feature representation.

Overview Systems and processes described herein allow a lengthy video to be shortened by automatically identifying one or more key video points and making those available to a user. The system or process may accept an input requesting one or more salient moments from original content. In one or more embodiments, the system may identify, extract and process a plurality of moment candidates from original content including a plurality of videos (e.g., m-number of videos). In various embodiments, the system may score the importance of each moment in the combined set and may identify (e.g., based on importance scores) n-number of moments from the combined set of moment candidates, wherein the identified n-number of moments are merged into a final summarization of the original content. According to one embodiment, importance scores are generated by aggregation of a plurality of importance sub-scores according to optimized weight values. In at least one embodiment, each importance sub-score is generated from a particular analytical modality that is used to evaluate frames of the original content and elements thereof and to identify significantly salient segments (e.g., moment candidates) by generation of candidate moment markers defining the boundaries of sets of frames that are determined to be significantly salient and significantly similar.

In various embodiments, the system performs a process for identifying and providing key video points, wherein the process includes, but is not limited to: 1) accepting an input from a user, the input designating at least one video and including at least one n value (e.g., as described later herein); 2) processing the at least one video to categorize one or more elements (e.g., speech visuals, etc.) of the video; 3) extracting one or more items (e.g., text, visuals, audio, etc.) from the at least one video; 4) dividing the at least one video into one or more segments; 5) calculating an importance metric for each of the one or more segments; 6) ranking the one or more segments based on the importance metric of each; 7) selecting a plurality of the one or more segments that were highly ranked; 8) generating titles and descriptions for the plurality of segments; 9) combining the titles, descriptions, and plurality of segments into a single video or a collection of key moments (e.g., the plurality of segments); and 10) providing the single video or collection of moments to users.

In at least one embodiment, the systems and processes automatically identify meaningful moments in original content (e.g., videos). The foregoing description places no constraints on the videos type of original content processed by the described systems and processes. To further describe, by example, the systems and processes, portions of the foregoing description are placed in the context of specific types of original content, such as informational videos.

Various embodiments, of the present systems and processes are operative to process informational videos, for example, that focus on technical products such as software (APIs).

In one or more embodiments, the systems and processes automatically identify and extract moments that are combined into a final summarization of original content, which is communicated to a user. In some embodiments, the systems and processes identify and extract a plurality of moment candidates that are short portions of the original content that represent a salient concept and/or serve as a semantically coherent segment of the original content. In various embodiments, the systems and processes compute and rank the relevance and/or importance of the moment candidates and determine one or more top-ranked moment candidates to be combined (and, in some embodiments, post-processed) into a final summarization. In one or more embodiments, the system may leverage clustering techniques to perform segment marker generation and placement. In one embodiment, the system may place segment markers such that a specific number of segments may be created, wherein the specific number may be based upon a user input n that is received by the system or generated dynamically thereby.

In various embodiments, the system, via clustering techniques and in an unsupervised manner, may categorize one or more parts of at least one video to develop category-specific summary processes. In one or more embodiments, the system may employ deep clustering and deep embedding networks, which directly build on the feature representations generated by an auto-encoder, or the like. In at least one embodiment, the system conducts local topic modeling on each segment by using supervised and unsupervised learning algorithms, and by creating numerous classifiers. In various embodiments, local topic modeling may further include, but is not limited to, automatically clustering parts of a video according to (initially unknown) semantic units (e.g., classifiers or topics) that are learned automatically (e.g., by the system from unlabeled data). Thus, aspects of the system, by using topic modeling, may automatically identify semantically coherent units in the video data (e.g., segmentation data, or the like).

In some embodiments, the system may perform computation and comparison of one or more relatedness metrics, such as a Word Mover's Distance (WMD), or the like. Per the present disclosure, a WMD may refer to a measure of the distance between two distributions over a region D. In various embodiments, the system (using WMD, or the like) quantifies the number of edits and/or amount of changes required to transfer one data point (e.g., in a multi-dimensional representation) into another data point. Thus, WMD, or the like may serve as a contextual distance measure that is used by the system for similarity and/or dis-similarity measurements between frames or other segments of original content.

In one or more embodiments, the system categorizes one or more segments of original content. In various embodiments, the system performs one or more analyses on each of the one or more segments, wherein the analysis performed is based on the category of the associated segment. For example, a segment categorized, by the system, as a "slide" (e.g., of a presentation), or the like may be analyzed via machine vision and/or optical character recognition. In at least one embodiment, a segment categorized as a "software demo", or the like may be analyzed via optical flow calculations. In some embodiments, a segment categorized as a "panel", or the like (e.g., a "talk") may be analyzed via facial, person and/or pose recognition processes, in combination with one or more other analysis processes. In one or more embodiments, the system, using heuristics and entropy measures, extracts informational content from each frame and/or each determined segment of the original content, wherein the extracted informational content may serve as a basis for generating a description of the frame or segment contents, or of a moment or final summarization including the frame or segment. In some embodiments, the system generates the description by one or more processes, which seek to satisfy a pre-determined or maximized entropy threshold.

In various embodiments, the system calculates an information content metric, such as an importance score, for each frame of original content and the system determines a plurality of moment candidates based on identifying and merging sets of frames demonstrating an importance score that satisfies a predetermined and/or optimized importance threshold. According to one embodiment, the importance score is computed by aggregating a plurality of importance sub-scores, each sub-score being associated with a particular analytical modality. In at least one embodiment, importance sub-scores include, but are not limited to, heuristic measures and information theoretic measures (e.g., for example, entropy, Bayesian surprise, Bayesian perplexity, etc.). In one or more embodiments, the system performs one or more similarity measures to merge importance threshold-satisfying frames or frame sets into a plurality of moment candidates. In various embodiments, titles and descriptions for moment candidates are generated from visual text and spoken content analyses and associated data.

In various embodiments, the system may compute an importance score for each of the plurality of moment candidates and determine a subset of top-ranking moment candidates based on the importance scores. In at least one embodiment, ranking of the moment candidates forms a basis for summarization, wherein the system may extract a number of top-ranked moment candidates (e.g., moments) for inclusion in a final summary.

In various embodiments, the system creates a minimization function that detects relatedness between adjacent frames or sets of frames, and between moment candidates or segments thereof. In one or more embodiments, the system combines related frames or frame sets (and moment candidates or segments thereof) using the minimization function. In at least one embodiment, the system conducts relatedness minimization recursively until the operation arrives at a plurality of moments equal to a moment parameter n (e.g., n number of moments to be included in a final summarization). In one or more embodiments, the system performs one or more post-processing techniques on the plurality of top-ranking moments. In at least one embodiment, the one or more post-processing techniques may focus on retaining complete utterances (e.g., prevent a key moment from cutting off mid-utterance), extracting key frames (e.g., which are representative for a particular moment), and other heuristics.

In one or more embodiments, the system generates a text-based summary of each moment by extracting, from earlier-generated transcripts, sentences that carry the most information as measured by various information measures. In at least one embodiment, the system generates transcripts by converting audio elements of original content into text. In some embodiments, the system uses natural language processing techniques to summarize transcripts and create one or more text-based summary(ies). In various embodiments, the system may use the text-based summaries to generate one or more titles and descriptions for inclusion in a final summarization. In at least one embodiment, the system provides moments and text-based summaries thereof (e.g., transcripts) to an editing engine. In some embodiments, the editing engine separates the plurality of key moments into individual clips (such as MP4 files) with metadata including a corresponding title and description of the moment.

In one or more embodiments, various types of original content demonstrate an inherent structure that can be utilized for automated processing (e.g., moment identification and extraction, and summarization). In some embodiments, for original content including slides or other visual presentations of salient subject matter, the systems and processes assume that specific information is aligned with the individual slides, hence resembling an effective initial segmentation of the original content.

In various embodiments, the present systems and processes leverage one or more analysis techniques for annotating original content with candidate markers. According to one embodiment, a candidate marker refers to an annotated timestamp that may serve as a seed-point (or point bounding a seed-point) for a potential key moment of original content. In at least one embodiment, the present systems and processes include generating sets of candidate markers, each set being based on analysis of a particular modality of data extracted from the original content. In various embodiments, the multimodal techniques for analyzing and annotating original content with candidate markers is referred to a "multimodal chapterization."

Overview of Exemplary Multimodal Summarization Systems and Processes According to one embodiment, a multimodal summarization process includes, but it not limited to, annotating each frame of original content with a plurality of candidate moment markers sets and combining candidate marker sets according to specific weights to generate a final set of moment candidates defined by the combined markers. In at least one embodiment, the final set of moment candidates are analyzed and ranked by relevancy or importance and a set of top-ranked moment candidates are selected and combined to generate a final summarization of the original content. In one or more embodiments, each set of candidate moment markers is generated from a particular analytical modality. In various embodiments, the analytical modalities include, but are not limited to: 1) layout changes; 2) speaker changes; 3) topic changes; 4) visual text changes; 5) spoken text changes; 6) chapter changes and 7) other analytical modalities. In one or more embodiments, the candidate moment markers of each modality are merged to generate an importance score for each frame of the original content. According to one embodiment, the combination of candidate moment markers corresponds to an averaging together of each modality according to a predetermined and/or cross-validated set of weight values.

FIG. 1 shows an exemplary visualization 100 of multimodal summarization according to one embodiment. The visualization 100 includes original content 101 that is processed to generate a plurality of moment definitions 102 to be combined into a final representation of the original content 101. According to one embodiment, the original content 101 is analyzed to identify layout changes 103, chapter changes 104, speaker changes 105, topic changes 107, visual text changes 109, and spoken text changes 111. In various embodiments, indicia for the changes 103, 104, 105, 107, 109, and 111 shown are representative of candidate moment markers determined and recorded for each frame of the original content 101. In at least one embodiment, an amplitude of each indicia 105, 107, 109, 111 is representative of an importance sub-score computed for the corresponding frame of the original content 101. According to one embodiment, the importance sub-score is generated from one or more importance analyses that, for each analysis modality, segment the original content 101 into one or more segments defined by candidate moment markers and compute an importance sub-score for each frame of each segment.

According to one embodiment, each analysis modality includes a weight value 110A-F used to define an aggregation of the importance sub-score of each modality into an overall importance score 106 for each frame of the original content 101. In various embodiments, the weight values are determined and optimized by one or more techniques including, but not limited to, heuristics (for example, as provided by a subject matter expert) and machine learning-driven optimization processes, and other optimization techniques. In at least one embodiment, the overall importance score 106 of each frame is compared to an importance threshold 108, and frames that meet or exceed the importance threshold 108 are used to define the one or more moments 102.

In one or more embodiments, layout changes 103 refer to changes in organization between a frame of original content and one or more subsequent frames thereof. According to one embodiment, a mutual information classification technique is performed to classify each frame of a video as belonging to one of a plurality of determined layouts. In one example, original content is a video that includes a software demo portion, a general summary portion, and a question and answer (Q & A) portion. In the same example, an image-based layout analysis of the frames of the video finds that an arrangement of visual features differs between the software demo portion, the general summary portion, and the Q & A portion. The image-based layout analysis may compute pixel-based similarity scores between sequential frames of the video and determine large differences in similarities scores between frames as representing a layout change. Continuing the same example, the layout analysis outputs a set of candidate moment markers providing an annotation of the changes in layout throughout the video, which provide seed points for defining the semantic boundaries of the video portions.

In one or more embodiments, chapter changes 104 refer to transitions between semantically coherent units of original content. According to one embodiment, a top-down identification process, bottom-up aggregation process, or combination thereof is performed to partition original content into a plurality of units, each unit including significantly similar content. In one or more embodiments, an importance of each chapter is calculated, for example, based on a number of keywords, phrases, and or topics included in each chapter.

In various embodiments, speaker changes 105 refer to changes in speaker identity between a frame of original content and one or more subsequent frames thereof.

According to one embodiment, audio-based analysis is performed to determine an average pitch of spoken content corresponding to each frame of original content. In at least one embodiment, changes in speaker are determined by identifying differences in pitch between one or more frames in excess of a predetermined threshold. In various embodiments, one or more audio parameters are analyzed in combination with or in place of pitch. In some embodiments, the one or more audio parameters include, but are not limited to, tone, vocal pattern (e.g., expressed as an audio waveform), and other parameters. In one example, original content includes a video with spoken content as provided by three different speakers. In the same example, an audio-based analysis computes an average pitch of spoken content for each frame of the video and further computes a pitch difference between each frame. Continuing the example, the pitch differences are used to identify changes in speakers throughout the video; when a pitch difference between two frames exceeds a predetermined threshold, the timestamp at the frames' juncture is identified as a candidate moment markers. In the same example, the audio analysis outputs a set of candidate moment markers providing annotation of the changes in speaker throughout the video, which provides seed points for defining the semantic boundaries of the video portions. In some embodiments, speaker changes are determined based on a transcript extracted from original content. For example, an extracted transcript is analyzed to identify predetermined keywords associated with speaker changes, such as phrases introducing a speaker's name, title, etc. In one or more embodiments, original content is analyzed using one or more speaker diarisation techniques for partitioning audio content into homogeneous portions (e.g., each portion associated with a particular speaker).

In at least one embodiment, topic changes 107 refer to transitions from one topic to another topic between segments of original content (e.g., between frames or sets of frames thereof). According to one embodiment, topic changes are detected by analysis of an original content transcript. In one or more embodiments, the system performs topic modeling to cluster text according to abstract topic activations. In one example, an analysis of a transcript determines at least a first and second set of keywords, each set associated with at least a first or a second topic. In the same example, a clustering technique clusters portions of the transcript into clusters based on detecting the first or second set of keywords and, thereby, detecting boundaries of discussion of the at least one first topic or the at least one second topic. Continuing the same example, the system places candidate markers at the boundaries of the determined topic clusters.

In at least one embodiment, visual text changes 109 refer to changes in readable text throughout frames of original content. In one or more embodiments, readable text is identified in and extracted from each frame of original content (e.g., via OCR recognition and/or other techniques). In some embodiments, the extracted text is used to generate a vocabulary of each frame. According to one embodiment, the system analyzes the vocabulary, similar to described analyses of transcripts herein, and determines one or more keywords representative of each frame (or sets thereof). In various embodiments, candidate markers are generated bounding sets of frames based on the one or more keywords visually displayed in each frame.

According to one embodiment, spoken text changes 111 refer to changes in spoken content throughout frames of original content. In one or more embodiments, a plurality of keywords are determined from analysis of a transcript of spoken content. In at least one embodiment, the system analyses the transcript of each frame of the original content and generates candidate markers bounding sets of frames based on the one or more keywords spoken during each frame.

In various embodiments, the plurality of analytical modalities includes other modalities, such as, for example, prosody changes. According to one embodiment, prosody changes refer to changes in how spoken content is being delivered including, but not limited to, pitch, tone, use of emphasis, and other variations of spoken content delivery. In one or more embodiments, audio elements of original content are analyzed to identify such transitions in spoken content delivery, and sets of frames that include prosody changes may define semantic groupings that define boundaries of moment candidates.

FIG. 1 shows an exemplary networked environment 100 in which operations of a summarization system 101 occur. According to one embodiment, the summarization system 100 is operative to transmit and receive transmissions from one or more users 202 via a network 218. In at least one embodiment, access to functions of the system 201 is provided and secured through an application programming interface 220. In one or more embodiments, the system 201 is in communication with one or more external services 204 via the network 218.

In various embodiments, the system 201 may dynamically and automatically (e.g., at the request of a viewer in real-time) serve a number of moments based on an input of n, wherein n may be any number of moments requested or a function of time. The value n may be received as an input from a user 202 or may be generated by the system 201 based on heuristics and/or machine learning models trained to identify whether a final summarization results in a sufficient compression of original content. Thus, a user 202 may specify a number of moments they wish to view from original content, or a user 202 may specify an amount of time they wish to spend watching a number of moments extracted from the original content.

In one or more embodiments, the system 201 may accept the user input of n and/or a user input of a time interval (e.g., a period of time a user allots to viewing a video). In at least one embodiment, the present system processes the inputted time interval and automatically determines a value of n. In one or more embodiments, automatic determination of n may include, but is not limited to: 1) identifying existing system data pertaining to original content; 2) obtaining one or more computed and stored importance scores from a system database; and 3) determining a number of moments to include in a final summarization based on an optimized compression level of the original content.

In at least one embodiment, the system 201 includes, but is not limited to, a content extraction engine 203 for extracting various data from original content, a natural language processing (NLP) module 205 for processing audio to generate transcripts thereof, an analysis engine 208 for performing various analyses of data extracted from original content, a model service 209 for generating and executing various machine learning and other models, a data store 211 for storing and organizing various data, and a publisher 213 for generating and transmitting final summarizations of original content.

The data store 211 can be representative of a plurality of data stores 211 as can be appreciated. The data stored in the data store 211, for example, is associated with the operation of the various applications and/or functional entities described below. In various embodiments, the data store 211 includes, but is not limited to, user accounts 210 including data received from and associated with users 202, summarization data 212 including data extracted from original content and data generated from analyzes thereof, thresholds 214 including values for parametrizing operations of the system 201, and training data 216 including original content and summarizations thereof for augmenting performance of models generated at the model service 209. In at least one embodiment, training data 216 includes multimedia content (e.g., original content) and final summarizations thereof. In one example, the training data 216 includes videos of webinars, machine (and manually) generated audio transcripts, and meta-information about speaker and speaker changes. In the same example, the training data 216 also includes external meta-information about the provider(s) of the multimedia content (e.g., including information about the provider extracted from one or more sources, such as the Internet).

According to one embodiment, the content extraction engine 203 processes original content and extracts a plurality of data therefrom including, but not limited to, audio content, visual content, and metadata. In one or more embodiments, audio content includes one or more audio tracks, visual content includes images, videos, animations, and other visible data, and metadata includes closed captioning data, timestamps (e.g., denoting an organization of the original content), and other information. In at least one embodiment, output of the content extraction engine 203 is stored with a particular user account 210 associated with the user 202 from which the original content was received. According to one embodiment, the content extraction engine 203 annotates all extracted content with timestamps indicative of the contents' temporal organization in the original content.

In one or more embodiments, the NLP module 205 processes audio extracted from original content and executes one or more NLP processes for generating a transcript of spoken content in the extracted audio. According to one embodiment, the NLP module 205 communicates with one or more external services 204 to execute the one or more NLP processes. In various embodiments, the NLP module 205 provides extracted audio to an external service 204 for performing NLP processes, such as, for example, Microsoft's Azure™ service. In at least one embodiment, the transcripts obtained via the NLP module 205 are stored in summarization data 212. According to one embodiment, the NLP module 205 (or external service 204) annotates transcripts with timestamps such that the temporal organization of the transcripts' content in the original content is mapped.

According to one embodiment, the analysis engine 207 generates candidate markers for summarizing original content (and segments thereof) and for identifying moment candidates. In at least one embodiment, the analysis engine 207 generates a set of candidate markers for each modality of analysis including, but not limited to: 1) layout changes; 2) speaker changes; 3) topic changes; 4) visual text changes; 5) prosody changes; and 6) other analytical modes. In one or more embodiments, the analysis engine 207 performs similarity and/or importance analyses to generate importance sub-scores for each frame of original content 101 for each modality of analysis performed thereon. In various embodiments, the analysis engine 207 includes a plurality of engines for analyzing (as further described herein) various content extracted from original content. In at least one embodiment, the analysis engine 207 includes, but is not limited to: 1) a transcript engine for analyzing transcripts; 2) an image analysis engine for analyzing frames of original and extracted content; 3) an audio processing engine for analyzing extracted audio content; and 4) other engines for executing various functions discussed herein. In some embodiments, the analysis engine 207 includes one or more processors and one or more servers for supporting performance of various activities discussed herein. In various embodiments, the analysis engine 207 employs a plurality of computing devices that may be arranged, for example, in one or more server banks or computer banks or other arrangements. Such computing devices can be located in a single installation or may be distributed among many different geographical locations. For example, the analysis engine 207 can include a plurality of computing devices that together may include a hosted computing resource, a grid computing resource, and/or any other distributed computing arrangement. In some cases, the analysis engine 207 can correspond to an elastic computing resource where the allotted capacity of processing, network, storage, or other computing-related resources may vary over time.

In one or more embodiments, the model service 209 generates, trains, and executes various machine learning models for supporting summarization processes described herein. In at least one embodiment, the model service 209 generates moment summarization models for identifying moment candidates based on outputs of the analysis engine 207 and other parameters. The model service 209 can generate and train machine learning models using training data 216. In one or more embodiments, for each original content summarized by the system 201, the model service 209 generates and trains one or more machine learning models to process sets of candidate markers output and/or importance scores and sub-scores by the analysis engine 207 and select a subset of the candidate markers for use in defining moments of the original content that are merged into a final summarization.

In one example, training data 216 includes original content, sets of candidate markers for moment candidates, and a final summarization of moments from the original content (e.g., as defined by a subset of the set of candidate markers). In the same example, the model service 209 generates and executes a machine learning model for outputting a set of moment markers used to define a final summarization of the original content. Continuing the same example, the model service 209 iteratively evaluates the accuracy of the model output by comparing the output to the final summarization moment marker subset. In the same example, until an accuracy of the model satisfies a predetermined threshold, the model service 209 iteratively adjusts one or more weight values (and/or other parameters) used by the model to select moment markers from the set of candidate markers.

In various embodiments, the publisher 213 generates final summarizations of original content by merging a plurality of top-ranked moment candidates (e.g., as defined by a top-ranked set of candidate markers). In one or more embodiments, the publisher 213 creates a time-series visualization of a final summarization including one or more key moments. In at least one embodiment, the system generates a single embedded code that can be pasted on a webpage, wherein the code allows a user to stream the one or more key moments and view key moment metadata. In one example, the publisher 213 creates a visual representation of the time-series visualization. In the same example, the publisher 213 converts the visual representation to an HTML-based embed code, which may be suitable for rendering the visualization inside an electronic message (e.g., such as an email).

In various embodiments, the publisher 213 captures audience engagement data and analytics related to streaming behavior of one or more key moment videos by one or more users 202 (or other entities viewing final summarizations). In one or more embodiments, the publisher 213 provides the captured data and analytics as an additional input to processes of the analysis engine 207. For example, the captured is used for adjustment of minimization functions and parameter weights (e.g., for use in future key moment generation activities). In at least one embodiment, the system 201 may, automatically and in real time, revise and regenerate one or more key moments using audience engagement data and analytics as an additional input to key moment identification and extraction processes.

The network 218 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

Figure 3:
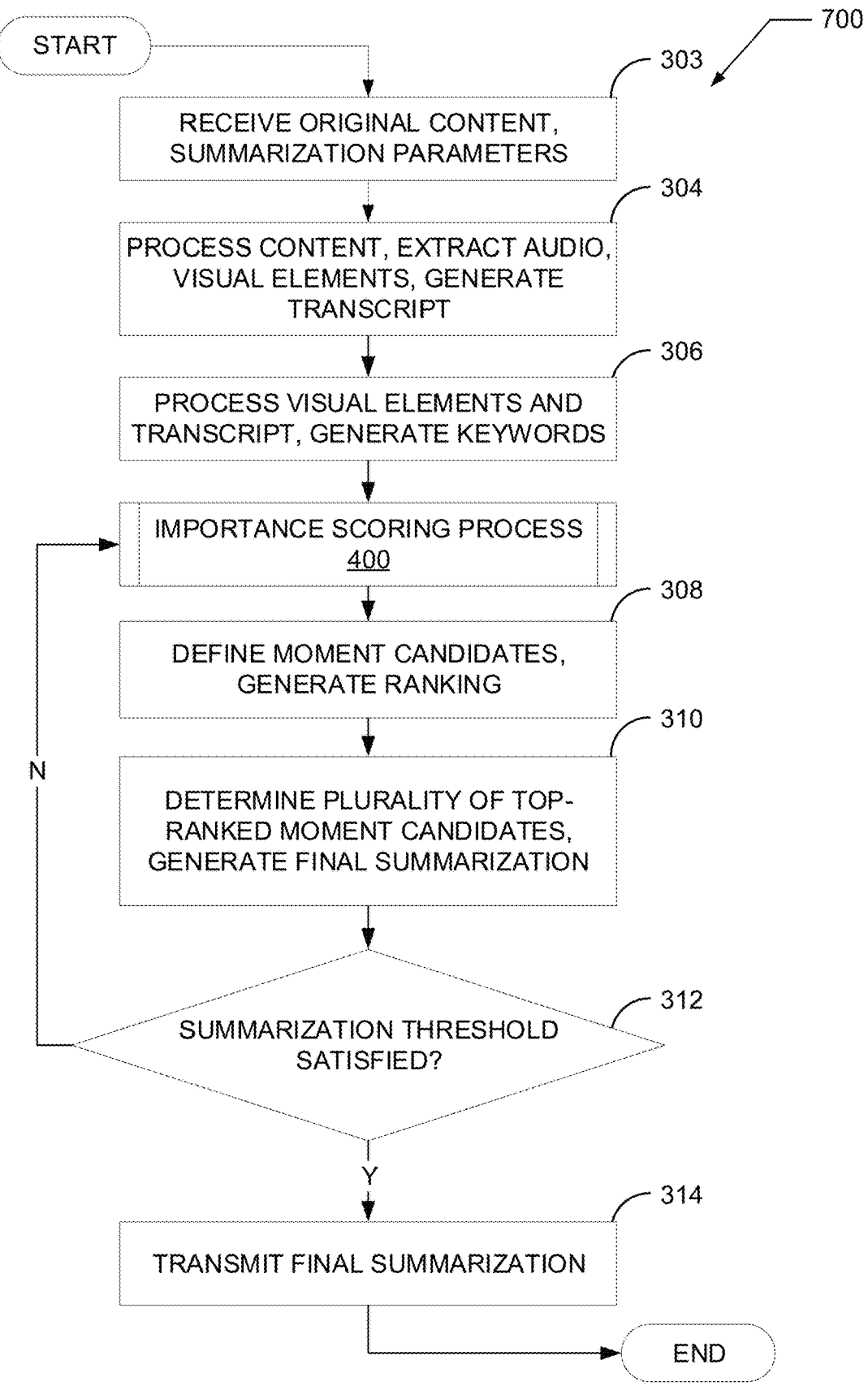
FIG. 3 is a flowchart of an exemplary importance scoring process according to one embodiment.

FIG. 3 shows a flowchart of an exemplary summarization process 300 for processing original content from a user 202, generating a plurality of moment candidates, identifying a subset of top-ranked moment candidates, and merging the subset into a final summarization that is shared with the user 202.

One should note that the flowcharts included herein show the architecture, functionality, and operation of a possible implementation of the described systems and processes. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

At step 302, the system 201 receives original content and one or more summarization parameters. The original content may be any multimedia content including, but not limited to, one or more videos, a webinar, a presentation, a slideshow, a product demonstration, or other multimedia content. In at least one embodiment, the original content includes any number of files for storing audio content, visual content, and metadata. Audio files types include, but are not limited to, .aif, .wav, .mp3, .ogg, .wma, .aac, .ram, and other audio formats that will become apparent to one of ordinary skill in the art. Video file types include, but are not limited to, .avi, .mp4, .wmv, .mov, .ogg, .fly, .m4v, .dv, and other suitable formats. Metadata file formats include, for example, .txt, .HTML, .XML, .RDF, and other suitable formats. In at least one embodiment, metadata may include, but is not limited to, timestamps, tables of contents, transcripts, titles, descriptions, and other information related to the audio-visual elements or other elements of the original content.

The original content and summarization parameters may be received at a website hosted by or in communication with the system 201. For example, a user 202 accesses a website that includes a feature for uploading original content and includes fields for receiving inputs or selections of summarization parameters. In at least one embodiment, the one or more summarization parameters include, but are not limited to: 1) a number m of moments to be included in a final summarization of the original content; 2) a duration l that refers to a desired duration of a final summarization; 3) one or more keywords used by the system 201 to drive summarization processes discussed herein; 4) one or more key images (for example, an image of a speaker's face) used by the system 201 to drive summarization processes; 5) a desired output format including, but not limited to, download links, streaming links, emails, etc.; and 6) other suitable parameters for configuring summarization processes or outputs thereof.

At step 304, the content extraction engine 203 processes the original content and extracts various audio, visual, and other elements therefrom. In at least one embodiment, the content extraction engine 203 extracts one or more audio tracks from the original content. For example, the content extraction engine extracts a dialogue audio track, a music audio track, and an effects audio track. In various embodiments, the content extraction engine 203 extracts each frame of the original content. According to one embodiment, the content extraction engine 203 extracts closed captioning data including a subset of closed captioning data associated with visual elements and a second subset of closed captioning data associated with audio elements (e.g., spoken content). In one or more embodiments, the content extraction engine 203 stores the extracted elements as summarization data 212. In at least one embodiment, the extraction engine 203 provides extracted audio elements and/or closed captioning data associated therewith to the NLP module 105.

At step 304, the NLP module 205 generates a transcript from the extracted audio elements and/or the closed captioning data associated therewith. According to one embodiment, the NLP module 205 retrieves the extracted audio elements from the data store 211 and performs one or more NLP processes to automatically generate a transcript based on the retrieved elements. In one or more embodiments, the transcript is stored in JSON format, or other suitable formats for supporting analysis and modeling processes discussed herein.

According to one embodiment, the transcript is annotated with begin and end timestamps for each sentence of the transcript, the timestamps corresponding to temporal periods during the original content in which the sentence is spoken. In some embodiments, begin and end timestamps are provided at the word or phrase level. In at least one embodiment, a predetermined keyword or key-phrase table is used to identify keywords and key-phrases in the transcript and add begin and end timestamps indicating the time periods at which they are spoken in the original content. In various embodiments, the transition and keyword-based timestamps provide for a first level segmentation of the original content into a plurality of semantically coherent and relevant units. According to one embodiment, the transcript of the original content is further processed in an NLP processing pipeline to filter out filler words based on predetermined lists of terms (e.g., including words such as "uh," "uhm," and etc.).

In at least one embodiment, the NLP module 205 uses API 220 (or another API) for generating the transcript via a third-party service, such as, for example Microsoft's Azure™ service or Amazon's Amazon Web Service™ (AWS) service. In one or more embodiments, via the API 220 or another API, the NLP module 205 calls one or more external services 204 to request generation of a transcript from the retrieved elements. In one example, the NLP module 205 calls an external service 204, transmits the extracted audio elements and/or closed captioning data, and requests generation of a transcript. In the same example, the external service 204 performs one or more NLP processes on the transmitted information, generates a transcript, and transmits the transcript to the NLP module 205.

At step 306, the visual elements and transcript are processed to generate a plurality of keywords. In at least one embodiment, based on keyword identification and detection, the transcript and/or visual elements are annotated with determined candidate markers for segmenting the original content into moment candidates. In at least one embodiment, keyword identification may be supplemented with a table of keywords associated with the original content. The table of keywords may be stored in a user account 210 associated with the user 210 from which the original content was received. The table of keywords may be retrieved from a plurality of keyword tables in the data store 212, and the retrieved table may be based on a type of the original content or one or more topics discussed therein.

According to one embodiment, the analysis engine 207 analyzes the visual elements and determines one or more keywords displayed therein. For example, the analysis engine 207 performs an optical character recognition (OCR) process on each frame of the visual elements to generate a vocabulary of terms included in each frame. In the same example, the analysis engine 207 analyzes the frequency of terms included across the frames to determine one or more keywords.

In at least one embodiment, the analysis engine 207 analyzes the transcript to identify a plurality of keywords that are mapped across the sentences of the transcript. In various embodiments, sentences that do not contain a keyword (or a particular level of keywords and/or phrases) are removed from the transcript, thereby providing for a compression of the spoken content and an initial, transcript-based summarization of the original content. According to one embodiment, keyword identification is performed using a keyword extractor, such as, for example, YAKE. In one example, the top k number (e.g., 50, 100, etc.) of YAKE-identified keywords are extracted and mapped to each sentence of the original content transcript, the original content transcript then being trimmed to include only YAKE keyword-containing sentences. In the same example, because not all sentences contain matched YAKE keywords, the trimmed transcript represents a summarization of the spoken content. Continuing the same example, because sentences are annotated with begin and end time stamps, the trimmed transcript is mapped onto a timeline of the original content and, thereby, provides a first-level summarization and segmentation of the original content (e.g., driven by keyword identification and mapping).

Following step 306, the system 201 performs one or more importance scoring processes 400. According to one embodiment, the process 400 includes multimodal analysis of various modalities of the original content including, but not limited to, layout changes, speaker changes, topic changes, visual text changes, prosody changes, and other modalities. In various embodiments, the process 400 generates, for each frame of the original content and for each analytical modality, an importance sub-score representative of the computed salience of the frame in the particular analytical modality. According to one embodiment, an importance score is computed for each frame by aggregating the importance sub-scores thereof according to optimized weight values. Exemplary description of the process 400 is further described herein with reference to FIG. 4.

At step 308, the system 201 generates a ranking of moment candidates based on the importance scores output from the process 400. According to one embodiment, for each frame of the original content, the system 201 compares the frame's corresponding importance score to a predetermined importance threshold. In one or more embodiments, upon determining the frame's importance score exceeds the predetermined or optimized (e.g., machine-learned and cross-validated) importance threshold, the system 201 annotates the original content with a moment candidate marker (e.g., a timestamp) that tags the frame for inclusion in a moment candidate. In at least one embodiment, the frames and importance scores thereof are evaluated in sequence. According to one embodiment, the first frame demonstrating an importance score above the predetermined threshold functions as a seed-point for a particular moment candidate.

In at least one embodiment, following a seed-point frame, sequentially subsequent frames with an importance score satisfying the threshold are tagged for inclusion in the particular moment candidate (e.g., via annotation of the original content with markers), thereby extending the bounds of the moment candidate. In various embodiments, when the system 201 determines that an importance score of a frame subsequent to a seed-point frame does not satisfy the threshold, the system 201 bounds the particular moment candidate to the subset of frames preceding the determined unimportant frame, thereby providing a timestamped definition for the moment candidate.

At step 310, the system 201 determines a plurality of top-ranked moment candidates and combines the moment candidates into a final summarization of moments. In at least one embodiment, the system 201 retrieves a summarization parameter n referring to a number of moments to be included in a final summarization and selects n number of top-ranked moment candidates. In at least one embodiment, because the moment candidates are timestamped based on a timeline of the original content, the system 201 automatically retrieves frames corresponding to the timeframe of original content defined by each top-ranked moment candidate. According to one embodiment, the retrieved frames are merged into moments defining the final summarization. In various embodiments, to enhance smooth transitions in the final summarization, one or more transition animations are inserted into the transition points between moments. In one or more embodiments, the system 201 generates a transcript corresponding to the spoken content of the generated final summarization. According to one embodiment, the system 201 generates a summary of each moment from the transcript, and each moment summary may be inserted into the final summarization as visual text, as closed captioning data, and/or may be provided in a user interface or website in which the final summarization is presented.

In various embodiments, metadata of each of moment is augmented with a transcript of the moment and/or a list of top keywords determined from the original content. In one or more embodiments, the system identifies and extracts (into a list) one or more top keywords through a combination of frequency analysis and context classification. The frequency analysis may include, for example, identifying which words were mentioned most and least. The context classification may include, for example, automatically assigning a category label to text, which the system may perform by using existing databases of text categories or by using learned and/or optimized text categories At step 312, the final summarization is compared to a summarization threshold. In at least one embodiment, the summarization threshold is a length 1 referring to a desired duration of the final summarization (e.g., 3 minutes, 5 minutes, 10 minutes, etc.). According to one embodiment, if the system determines that a duration of the final summarization exceeds the summarization threshold, the process 300 performs more additional importance scoring processes 400. In various embodiments, the one or more additional processes 400 are performed using the final summarization as an input and result in generation of a truncated final summarizations to be reevaluated at step 312. In one or more embodiments, if the duration of the final summarizations satisfies the summarization threshold, the process 300 proceeds to step 314.

At step 314, the final summarization is transmitted or shared with one or more users 202. The final summarization may be viewed as a truncated version of the original content comprising only the most-relevant and/or most important segments thereof. The final summarization may provide a level of specificity that allows a user 202 to more rapidly digest the concepts associated with the original content. In some embodiments, the final summarization is used as a preview or summarization of the original content or one or more products or services advertised therein. For example, a final summarization may summarize a software demo and, thereby, function as a consumer-facing overview of the most important or relevant aspects of the software demo. In another example, a final summarization truncates a series of webinars into a plurality of key moments representing the most salient segment(s) of each webinar in the series.

In some embodiments, the final summarization is a video file, or a plurality of files encoding the audio, visual, textual, and metadata elements comprising the final summarization. In at least one embodiment, a final summarization video file and a metadata file (or plurality thereof) are provided, the metadata file including transcripts, titles, closed captioning data, and etc. associated with the final summarization and/or moments comprising the same. According to one embodiment the metadata file includes a table of timestamps corresponding to the portions of the original content that were extracted and merged to generate the final summarization. In various embodiments, the table includes titles, transcripts, and other elements extracted from the original content or generated during summarization processes for generating the final summarization.

According to one embodiment, a link to the final summarization is generated, the link providing access via the network 218 (or another network) to a webpage at which the final summarization may be viewed, downloaded, and/or revised according to user inputs. In one or more embodiments, an electronic transmission, such as an email, is generated and includes a file containing the final summarization or the generated link thereto. In at least one embodiment, the final summarization is transmitted to the user 202 from which the original content was received. In some embodiments, the final summarization is uploaded to one or more storage destinations specified in summarization parameters received from the user 202. According to one embodiment, the final summarization is stored with the user account 210 of the user from which the original content was received.

Figure 4:
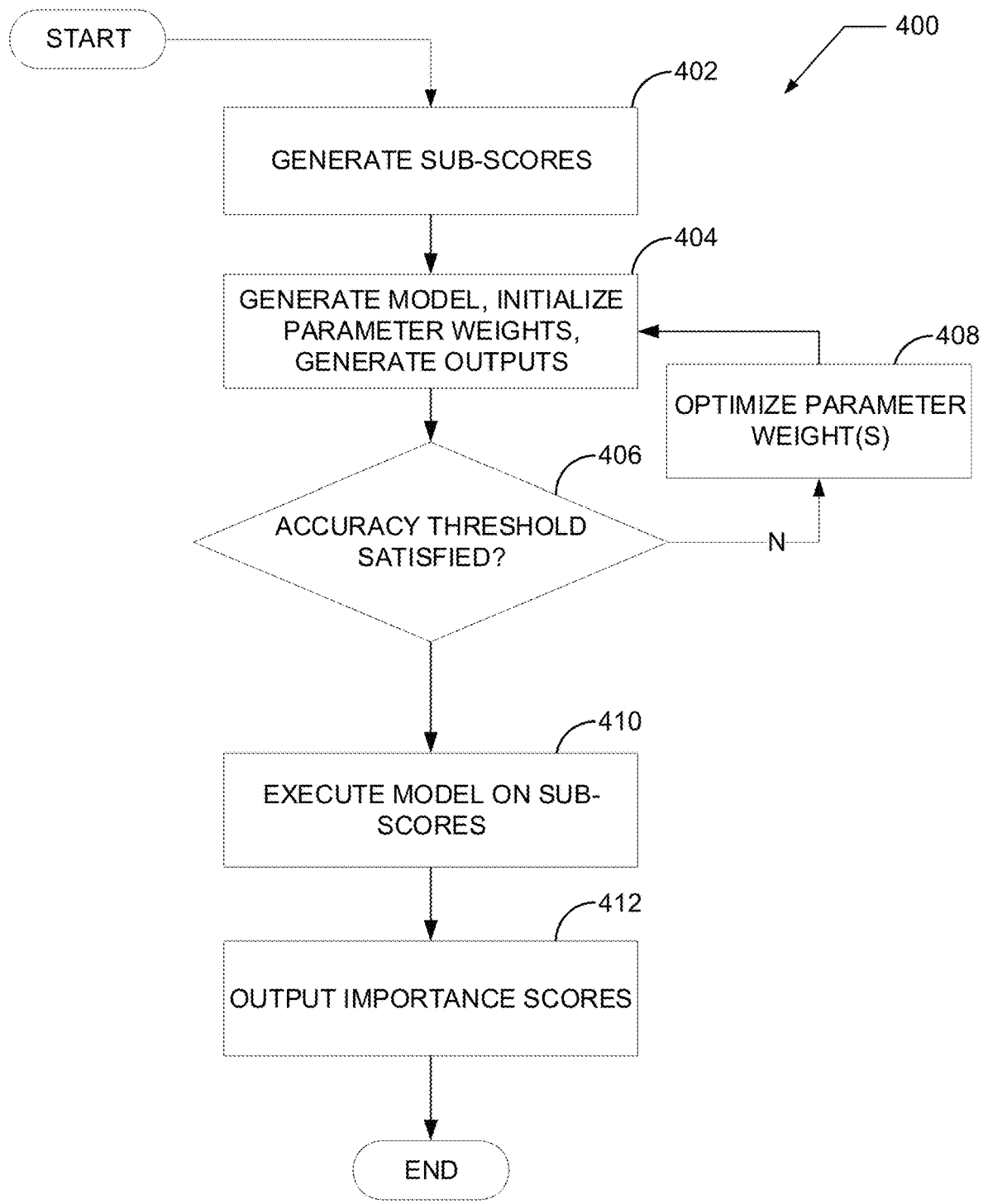
FIG. 4 is an exemplary visualization of content summarization according to one embodiment.

FIG. 4 shows a flowchart of an exemplary importance scoring process 400.

At step 402, for each frame of the original content, a plurality of importance sub-scores are generated in a plurality of analytical modalities. In at least one embodiment, the analytical modalities include, but are not limited to, layout analysis, speaker analysis, topic analysis, visual text analysis, spoken content analysis (e.g., from text extracted from audio content, prosody analysis, and other suitable analytical modes. According to one embodiment, each analytical modality outputs an importance sub-score for each frame of the original content, the importance sub-score quantifying the salience of the frame (e.g., and content therein) as determined in the particular modality of analysis. In one or more embodiments, each importance sub-score is stored in summarization data 212. In various embodiments, generation of the importance sub-scores may include generating and training one or more machine learning models towards identifying the importance-determining features specific to each analytical modality. For example, a machine learning model for detecting changes in layout may be trained using training data 116 in a process similar to the process 400. In another example, a machine learning model is trained to perform local topic modeling for identification of topics and content related thereto from the original content (e.g., or from a transcript of audio content generated therefrom).

In at least one embodiment, steps 404-408 are a process for training a machine learning model for generating summarization of original content based on optimized aggregation of importance sub-scores into importance scores that are used to define moment candidates for potential inclusion in a final summarization. According to one embodiment, the steps 404-408 are performed by the model service 209 and using one or more training datasets retrieved from training data 216.

At step 404, output including a set of importance scores defining a set of moment candidates are generated from a machine learning model that is initialized along with a set of initial weight values for aggregating the importance sub-scores of each frame into importance scores used for defining moment candidates. In one or more embodiments, the machine learning model is provided a training dataset including predetermined importance sub-scores, initial weight values, and a set of predetermined moment candidates.

At step 406, an accuracy metric of the output from step 404 is compared to an accuracy threshold. In at least one embodiment, the accuracy metric is a similarity measure between the generated set of moment candidates and the set of predetermined moment candidates. In one or more embodiments, if the accuracy metric satisfies the threshold, the process 400 proceeds to step 410. According to one embodiment, if the accuracy metric does not satisfy the threshold, the process 400 proceeds to step 408.

At step 408, one or more parameter weights are optimized towards improving the accuracy metric and/or reducing an error metric between the generated and predetermined sets of moment candidates. In at least one embodiment, a minimization function is used to optimize one or more parameter weights towards reducing an error metric in subsequent iterations of output generated by the machine learning module. According to one embodiment, the steps 404-406 are performed recursively until an iteration of the machine learning model generates output satisfying an accuracy and/or error threshold.

At step 410, the trained machine learning model is provided with the plurality of importance sub-scores from step 402 and the trained machine learning model is executed to aggregate the plurality of sub-scores into a plurality of importance scores according to the optimized parameter weight values determined in steps 404-408. In at least one embodiment, the aggregated importance scores are stored in summarization data 112.

At step 412, the plurality of importance scores are output from the trained machine learning model. In at least one embodiment, the plurality of importance scores are stored in the data store 111 as an importance-annotated timeline of the original content frames. In various embodiments, the importance scores may be continuously re-computed based on factors such as interaction data (e.g., a number of times each moment of a final summarization is skipped or viewed, a user rating of one or more moments in a final summarization, etc.) stored in one or more user accounts 210. In at least one embodiment, the system 201 may collect data pertaining to consumption of moments defined by the importance scores. In one or more embodiments, a consumption event and consumption data is recorded for each viewing session of each moment, wherein the consumption event may be defined as consumption (e.g., by a user 202 or other subject) of any portion a final summarization. In at least one embodiment, the recorded consumption events and data may be used to re-calculate one or more stored importance scores. For example, the consumption data may be used to generate an additional set of importance sub-scores that are aggregated with previously generated sub-scores to generated optimized importance scores. In another example the consumption data is used in training of a machine learning model, for example, as a parameter for optimizing aggregation weights for one or more importance sub-score modalities. In at least one embodiment, the system 201 may receive and process importance score updates from a user 202, for example, via a user feedback interface provided at a webpage on which a final summarization is provided.

Figure 5:
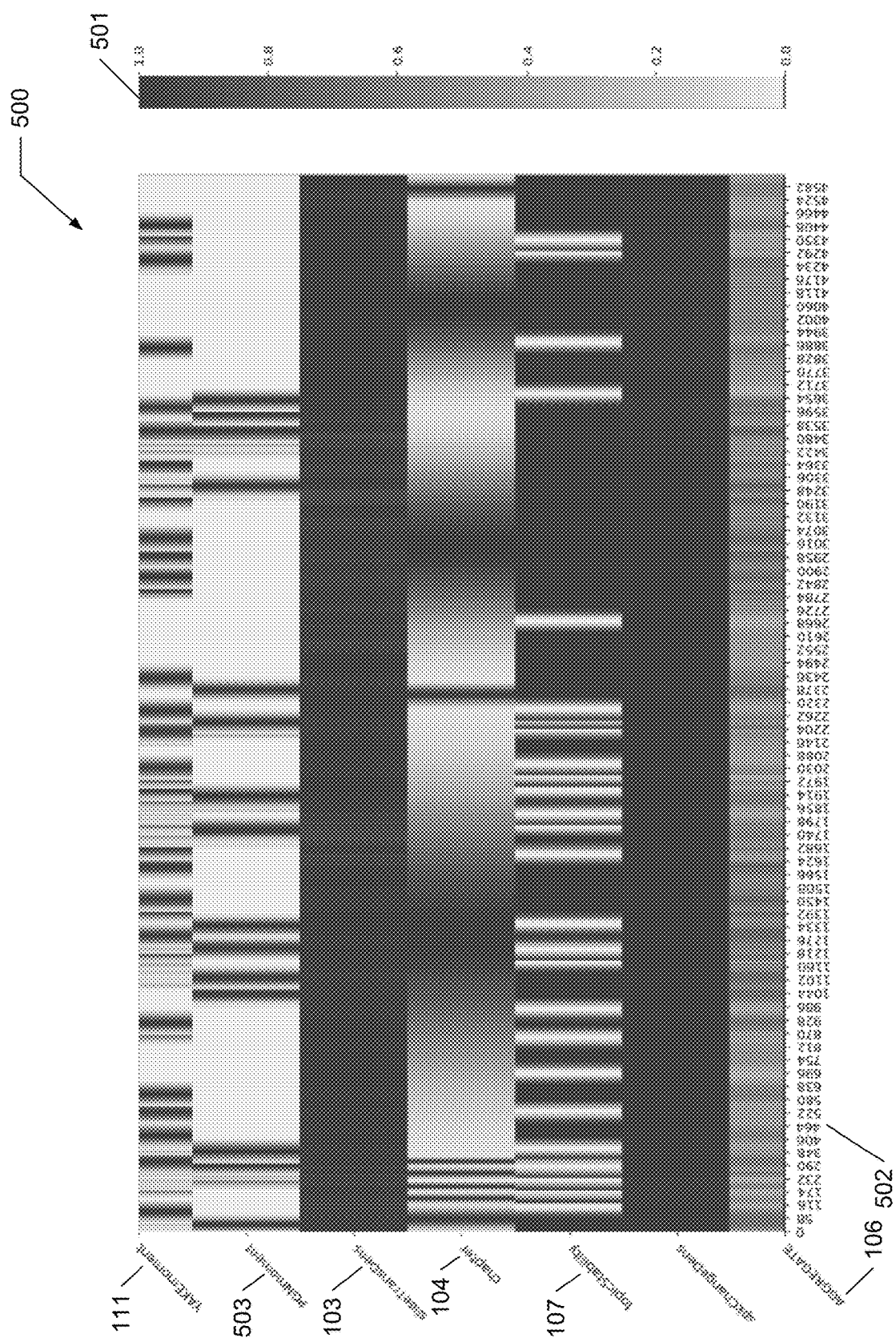
FIG. 5 is an exemplary visualization of content summarization according to one embodiment.

FIG. 5 shows a visualization 500 of exemplary multimodal content summarization. In at least one embodiment, the visualization 500 includes an importance intensity axis 501 for indicating the computed importance sub-score of each frame of multimedia content across a plurality of analytical modalities including layout changes 103, chapter changes 104, topic changes 107, spoken text changes 111 (e.g., from keyword-based importance ranking processes) and summarization-based importance rankings 503. It will be understood by one of ordinary skill in the art that the analytical modalities shown are for descriptive purposes and additional or alternative modalities may be included in multimodal content summarization as discussed herein.

In various embodiments, the visualization 500 includes a frame axis 502 that, in combination with the importance intensity axis 501, provides an indication of importance as determined for each frame of multimedia content across each analytical modality. In one or more embodiments, the visualization 500 includes an overall importance score 106 that is computed by aggregating the importance sub-scores generated by the various analytical modalities. According to one embodiment, the sets of frames demonstrating an overall importance score 106 above a threshold (not shown) are selected for inclusion in segments (e.g., moment candidates) that are ranked by relevancy, wherein one or more top-ranked moment candidates are selected for inclusion in a final summarization of the multimedia content.

Exemplary Summarization Using Transcripts

In one or more embodiments, transcript-based summarization includes two or more techniques including, but not limited to, bottom-up aggregation and top-down identification. According to one embodiment, transcription-based summarization includes using one or more machine learning methods, such as pointer generator networks, to automatically identify important segments in an audio transcript through generating summarizations thereof. In various embodiments, bottom-up aggregation generally refers to a fully data-driven aggregation of frame transcripts into chapter summaries. In at least one embodiment, bottom-up aggregation includes, but is not limited to, assessing importance/relevance of frame transcripts and/or aggregated chapterization and summarization of frame transcripts into chapter summaries driving determination of moment candidates and generation of a final summarization. In at least one embodiment, top-down identification generally refers to identification of key-phrases/keywords in frames or other segments of original content, and refers to determination and extraction of moment candidates that embed the identified key-phrases/keywords in a semantically coherent unit.
Exemplary Description of Top-Down Identification According to one embodiment, top-down moment identification of original content, such as a webinar, includes NLP-based analysis of extracted audio content (e.g., such as spoken content) as represented through a transcript generated therefrom. In various embodiments, keywords are automatically extracted from the transcript and serve as representations for the spoken content, the representations focusing on the most important/relevant content of the audio content (e.g., and thus, to a certain degree, the overall original content). In at least one embodiment, the keywords are identified and extracted based on a YAKE analysis of the transcripts that outputs a plurality of keywords or key phrases (e.g., 25, 50, 100, or a predetermined or dynamically determined number). In some embodiments, the number of keywords extracted from the transcript is determined from a machine learning model trained to predict a minimum number of keywords from a transcript that are representative of one or more topics identified in the transcript. In one or more embodiments, each sentence of the transcript is ranked for importance based on the number of keyword matches per sentence (e.g., the number of matches being a metric for importance estimation). In some embodiments, for each frame of original content or for each semantically coherent segment generated from the original content, a transcript importance score is generated based on the number of top-ranked sentences included in the frame or segment. The importance score of each frame or segment may be aggregated with other importance scores of other analytical modalities to generate a final importance score for the frame or segment.

In at least one embodiment, a plurality of top-ranked sentences are selected to serve as seed-points for moment candidates (or semantically coherent units that may be merged into moment candidates). In one or more embodiments, the seed-points are candidate moment markers mapped onto a timeline of the original content. In various embodiments, to define a plurality of moment candidates, a heuristics-based analysis, a machine learning-based analysis, or a combination thereof is performed to identify suitable temporal boundaries surrounding the candidate moment markers and, thereby, define each moment candidate using the determined boundaries. In at least one embodiment, a machine learning approach includes BERT analysis that automatically computes the temporal (and as such semantic coherency) in portions of the transcript defined by the plurality of top-ranked sentences. According to one embodiment, the BERT analysis outputs a plurality of boundaries (e.g., timestamps or transcript markers) that segment the transcript into a plurality of semantically coherent units that may serve as moment candidates. In at least one embodiment, the importance of each moment candidate is computed and a plurality of top-ranking moment candidates are selected for inclusion as moments in a final summarization. In some embodiments, a relevancy score is computed for each moment, for example, by identifying one or more key topics by performing local topic modeling on the YAKE-based transcript of the original content. According to one embodiment, the moments are ranked according to their relevance score and a subset of top-ranking moments demonstrating a relevance score satisfying a predetermined relevance threshold are merged into a final summarization.
Exemplary Description of Bottom-Up Aggregation In various embodiments, bottom-up aggregation determines and exploits structures inherent to the specific type of original content being analyzed. In one example, bottom-up aggregation exploits a structure inherent to slide-show based original content, such as webinars (e.g., in the form of individual slides that group the spoken content according to individual semantic units). In one or more embodiments, bottom-up aggregation seeks to merge subsequent frames and transcripts thereof if the transcripts are determined to include significantly semantically similar content. In at least one embodiment, similarity between frames is computed using a content-based measure such as a Word Mover distance. In one or more embodiments, a keyword analysis, such as YAKE, is performed to identify keywords and phrases of a transcript and the identified keywords and phrases are mapped across frames of original content. According to one embodiment, frames for which the transcript thereof does not include one or more (or a predetermined level) of keywords and phrases are automatically excluded from further analysis, thereby providing a first-level compression of the original content into a first-level summarization (e.g., because only a benchmark level of important sentences and associated therewith are retained for further analysis).

According to one embodiment, sets of frame transcripts are merged into chapter summaries that are further summarized into moment candidates through ranking the salience and/or relevance of individual sentences of the chapter summary. In at least one embodiment, the systems and processes generate a plurality of moment candidates that are compared for salience and/or relevance for selecting which of the plurality of moment candidates are combined into a final summarization of original content.

The following paragraphs provide exemplary embodiments of the present systems and processes placed in the context of generating a final summarization of a webinar (e.g., an informational video including spoken content and presentations of various visual content via slides).

In various embodiments, original content, such as a webinar, is received and submitted to one or more content extraction processes. In some embodiments, the one or more content extraction processes include a slide transition detection and annotation process. According to one embodiment, a webinar includes a plurality of frame sets, each of the plurality of frame sets corresponding to a slide of the presentation. In at least one embodiment, slide transitions are recognized automatically through elementary image analysis combined with selected heuristics. In various embodiments, candidate markers (e.g., time stamp annotations) are added to a timeline of the webinar to indicate the determined slide transitions and, thereby, used to extract and organizes segments of the webinar into a first-level set of semantically coherent units (e.g., slides).

According to one embodiment, the system identifies and merges semantically similar slide transcripts into chapter transcripts. In various embodiments, slide transcript refers to a transcript of spoken content that is cotemporal to the slide (e.g., the frames thereof) in the original content. In at least one embodiment, during semantic analysis and merging processes, slides are represented by a set of keywords extracted from audio and/or visual content associated with each slide. In one or more embodiments, similarity comparisons are performed, for example, based on computation of comparison metrics such as Word Mover Distances that measure similarity between slide transcripts, thereby taking into account the content captured by the transcript of each slide. In at least one embodiment, merging of a set of slide transcripts proceeds until a comparison metric between the merged slides and a subsequent slide falls beneath a predetermined similarity threshold. In at least one embodiment, the predetermined similarity threshold is optimized through one or more cross-validation processes.

As discussed, the multimedia contents (e.g., images, videos, animations, audio, etc.) of each slide may be stored in a multi-dimensional vector representation of the slide. In various embodiments, one or more elements from the multi-dimensional vector representations of each slide (e.g., the transcript of which was merged into the chapter transcript) are selected for inclusion in a multi-dimensional vector representation of the chapter. For example, based on a salience and/or coherence analysis of a chapter transcript, one or more most-relevant and/or most-salient content elements from the multi-dimensional vector representations of the slides are extracted and included in a multi-dimensional representation of the chapter.

In one example, a plurality of training datasets including videos (e.g., original content) are divided into a number of "folds" (e.g., four folds, seven folds, etc.). In the same a subset of the folds (e.g., four of the five folds) are used to train a machine leaning model for generating summarizations using a first similarity threshold, such as a WMD threshold. Continuing the example, the trained machine learning model, using the first similarity threshold, is tested on the fifth fold and an error metric is generated between the summarization of the fifth fold and a pre-generated summarization. In the same example, the process is repeated and a second, third, fourth, and etc. similarity threshold is determined using varied combinations of the folds until all possible fold combinations have been used to train a machine learning model and all folds have been tested on a trained machine learning model. Continuing the example, the plurality of similarity thresholds are ranked according to the error metric associated with the similarity threshold and one or more weights are assigned to each similarity threshold based on the error metric (e.g., a lower error metric resulting a greater weight). In the same example, the weighted similarity thresholds are averaged to generate an optimized similarity threshold.

According to one embodiment, following merging of slides into segments (e.g., which may be referred to as "chapters"), each sentence of the merged transcript of each chapter is analyzed for importance based on a YAKE analysis. In at least one embodiment, a top-ranking sentence is extracted from each chapter transcript based on a number of YAKE keywords included in the sentence. In one or more embodiments, each chapter transcript is ranked by importance based on a total number of YAKE keywords included in the transcript. According to one embodiment, a plurality of top-ranking chapters are classified as moment candidates. In at least one embodiment, a set of moments are determined from the plurality of moment candidates based on a relevance analysis, such as BERT, in which a relevance score is computed for each moment candidate and a plurality (e.g., n number) of top-ranking moment candidates are classified as moments for a final summarization of the webinar. In one or more embodiments, the moments are merged into a final summarization and the final summarization (or a visual display thereof) is annotated with the top-ranking sentence of each member, which thereby serve as a textual summarization of each moment.

It will be appreciated that the moments and timestamps thereof that are identified via top-down identification, bottom-up aggregation, or a combination thereof may be used by the system as moment candidates in a multimodal summarization process. For example, a plurality of moment timestamps output from a combined top-down identification and bottom-up aggregation process are aggregated, according to optimized weights, with moment timestamps determine from other analytical modalities to generate aggregated moment timestamps that result in a more optimized final summarization than a final summarization defined by moment timestamps of a single analytical mode.

From the foregoing, it will be understood that various aspects of the processes described herein are software processes that execute on computer systems that form parts of the system. Accordingly, it will be understood that various embodiments of the systems and processes described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/ or schemas, and program modules represent examples of the program code for executing steps of the processes disclosed herein. The particular sequence of such executable instructions or associated data structures represent examples of corresponding acts for implementing the functions described in such steps.

Those skilled in the art will also appreciate that the claimed and/or described systems and processes may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and processes of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and processes, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope.

Accordingly, the scope of the claimed systems and processes is defined by the appended claims rather than the foregoing description and the exemplary embodiments described therein.

What is claimed is:

1. A method comprising:
    receiving multimedia content comprising a plurality of frames;
    obtaining a transcript of the multimedia content;
    generating a plurality of keywords based on the transcript;
    mapping the plurality of keywords across each of the plurality of frames, frame by frame, wherein the mapping comprises:
        excluding one or more sentences from the transcript that do not contain a keyword from the plurality of keywords;
        annotating the transcript with one or more timestamps based on the plurality of keywords; and
        generating a keyword mapping comprising the transcript with the one or more timestamps and without the one or more sentences;
    computing, for each of the plurality of frames, an importance score based on the keyword mapping and a chapter score, wherein the chapter score measures transitions between semantically coherent units of the multimedia content;
    generating a ranking of the plurality of frames based on the importance scores and the chapter scores;
    determining one or more top-ranked frames from the ranking that satisfy an importance threshold;
    merging the one or more top-ranked frames into one or more moments; and
    aggregating the one or more moments into a summarization of the multimedia content.

2. The method of claim 1, wherein each of the plurality of frames comprises one or more audio elements, one or more visual elements, and metadata.

3. The method of claim 2, wherein the merging comprises aggregating at least one of the one or more audio elements, at least one of the one or more visual elements, and the metadata for each of the one or more top-ranked frames.

4. The method of claim 2, further comprising:
    extracting the one or more audio elements and the one or more visual elements; and
    generating the transcript based on the one or more audio elements and the one or more visual elements.

5. The method of claim 1, wherein generating the plurality of keywords comprises generating the plurality of keywords using a frequency-based keyword extraction method.

6. The method of claim 1, wherein the keyword mapping represents a first summarization of the multimedia content.

7. A system comprising:
    at least one server configured for receiving multimedia content, wherein the multimedia content comprises a plurality of frames; and
    at least one processor configured for:
    obtaining a transcript of the multimedia content;
    generating a plurality of keywords based on the transcript;
    mapping the plurality of keywords across each of the plurality of frames, frame by frame, wherein the mapping comprises:
        excluding one or more sentences from the transcript that do not contain a keyword from the plurality of keywords;
        annotating the transcript with one or more timestamps based on the plurality of keywords; and
        generating a keyword mapping comprising the transcript with the one or more timestamps and without the one or more sentences;
    computing, for each of the plurality of frames, an importance score based on the keyword mapping and a chapter score, wherein the chapter score measures transitions between semantically coherent units of the multimedia content;
    generating a ranking of the plurality of frames based on the importance scores and the chapter scores;
    determining one or more top-ranked frames from the ranking that satisfy an importance threshold;
    merging the one or more top-ranked frames into one or more moments; and
    aggregating the one or more moments into a summarization of the multimedia content.

8. The system of claim 7, wherein the importance score comprises weighting a plurality of sub-scores according to predetermined weight values.

9. The system of claim 8, wherein the plurality of sub-scores comprises the chapter score and a layout score.

10. The system of claim 9, wherein the plurality of sub-scores further comprises a topic score, a speaker score, and a visual text change score.

11. The system of claim 9, wherein the layout score measures a delta in one or more visual elements between adjacent frames from the plurality of frames.

12. The system of claim 11, wherein the delta is based on a mutual information classification performed to classify each of the plurality of frames into one of a plurality of predetermined layouts.

13. The system of claim 11, wherein computing the delta comprises determining, between the adjacent frames, a spatial change of respective pixels corresponding to each of the one or more visual elements.

14. The system of claim 7, wherein the semantically coherent units are identified by:
- identifying a plurality of sentences in the transcript;
- ranking each of the plurality of sentences based on the plurality of keywords;
- selecting one or more top-ranked sentences from the plurality of sentences; and
- identifying one or more boundaries based on the one or more top-ranked sentences to identify the semantically coherent units.

15. A non-transitory computer-readable medium embodying a program that, when executed by a computing device, causes the computing device to:
- receiving multimedia content comprising a plurality of frames;
- obtaining a transcript of the multimedia content;
- generating a plurality of keywords based on the transcript;
- mapping the plurality of keywords across each of the plurality of frames, frame by frame, wherein the mapping comprises:
  - excluding one or more sentences from the transcript that do not contain a keyword from the plurality of keywords;
  - annotating the transcript with one or more timestamps based on the plurality of keywords; and
  - generating a keyword mapping comprising the transcript with the one or more timestamps and without the one or more sentences;
- computing, for each of the plurality of frames, an importance score based on the keyword mapping and a chapter score, wherein the chapter score measures transitions between semantically coherent units of the multimedia content;
- generating a ranking of the plurality of frames based on the importance scores and the chapter scores;
- determining one or more top-ranked frames from the ranking that satisfy an importance threshold;
- merging the one or more top-ranked frames into one or more moments; and
- aggregating the one or more moments into a summarization of the multimedia content.

16. The non-transitory computer-readable medium of claim 15, wherein the program further causes the computing device to train at least one machine learning model to output the summarization of the multimedia content.

17. The non-transitory computer-readable medium of claim 16, wherein the at least one machine learning model is trained using the plurality of frames and the chapter score.

18. The non-transitory computer-readable medium of claim 16, wherein the at least one machine model is generated by initializing a plurality of weight values.

19. The non-transitory computer-readable medium of claim 18, wherein training the at least one machine learning model comprises:
- generating a second importance score for each of the plurality of frames;
- generating a second summarization of the multimedia content based on the second importance scores; and
- computing an error metric between the importance scores and the second importance scores and between the summarization and the second summarization.

20. The non-transitory computer-readable medium of claim 19, wherein the program further causes the computing device to:
- determine the error metric falls below an error threshold; and
- adjust the plurality of weight values to reduce the error metric.

* * * * *